United States Patent
Wang et al.

(10) Patent No.: US 11,176,099 B2
(45) Date of Patent: Nov. 16, 2021

(54) LOCKLESS SYNCHRONIZATION OF LSM TREE METADATA IN A DISTRIBUTED SYSTEM

(71) Applicant: VMware, Inc., Palo Alto, CA (US)

(72) Inventors: Wenguang Wang, Santa Clara, CA (US); Junlong Gao, Mountain View, CA (US); Richard P. Spillane, Palo Alto, CA (US); Robert T. Johnson, Palo Alto, CA (US); Christos Karamanolis, Los Gatos, CA (US); Maxime Austruy, Lausanne (CH)

(73) Assignee: VMware, Inc., Palo Alto, CA (US)

( * ) Notice: Subject to any disclaimer, the term of this patent is extended or adjusted under 35 U.S.C. 154(b) by 494 days.

(21) Appl. No.: 16/231,300

(22) Filed: Dec. 21, 2018

(65) Prior Publication Data

US 2020/0201822 A1    Jun. 25, 2020

(51) Int. Cl.
*G06F 16/178* (2019.01)
*G06F 16/18* (2019.01)

(52) U.S. Cl.
CPC ........ *G06F 16/178* (2019.01); *G06F 16/1873* (2019.01)

(58) Field of Classification Search
CPC .... G06F 16/178; G06F 16/1873; G06F 16/13; G06F 16/172; G06F 16/185; G06F 16/182
See application file for complete search history.

(56) References Cited

U.S. PATENT DOCUMENTS

| | | | |
|---|---|---|---|
| 10,740,300 B1* | 8/2020 | Lakshman | G06F 11/1464 |
| 10,924,548 B1* | 2/2021 | Karumbunathan | G06F 3/064 |
| 11,023,318 B1* | 6/2021 | Volkov | G06F 11/1076 |
| 2014/0188870 A1* | 7/2014 | Borthakur | G06F 16/23 707/736 |
| 2020/0089789 A1* | 3/2020 | Mace | G06F 16/2291 |

OTHER PUBLICATIONS

Unknown, "Amazon Elastic File System (EFS)," Amazon Web Services, Inc., Accessed Dec. 17, 2018, https://aws.amazon.com/efs/, 21 pages.

(Continued)

*Primary Examiner* — Alicia M Willoughby

(57) ABSTRACT

The disclosure herein describes synchronizing a data cache and an LSM tree file system on an object storage platform. Instructions to send a cached data set from the data cache to the LSM tree file system are received. An updated metadata catalog is generated. If the LSM tree structure is out of shape, compaction is performed on the LSM tree file system which may be on a different system or server. When an unmerged compacted metadata catalog is identified, a merged metadata catalog is generated, based on the compacted metadata catalog and the cached data set, and associated with the cached data set. The cached data set and the associated metadata catalog are sent to the LSM tree file system, whereby the data cache and the LSM tree file system are synchronized. Synchronization is enabled without the data cache or file system being locked and/or waiting for the other entity.

20 Claims, 8 Drawing Sheets

(56) References Cited

OTHER PUBLICATIONS

Unknown, "What Is Amazon S3?," Amazon Web Services, Inc., Accessed Dec. 17, 2018, https://docs.aws.amazon.com/AmazonS3/latest/dev/Welcome.html, 1 page.
Unknown, "Request Rate and Performance Guidelines," Amazon Web Services, Inc., Accessed Dec. 17, 2018, https://docs.aws.amazon.com/AmazonS3/latest/dev/request-rate-perf-considerations.html, 1 page.
Unknown, "Amazon EC2," Amazon Web Services, Inc., Accessed Dec. 17, 2018, https://aws.amazon.com/ec2/?nc2=h_m1, 13 pages.
Unknown, "AWS Lambda," Amazon Web Services, Inc., Accessed Dec. 17, 2018, https://aws.amazon.com/lambda/?nc2=h_m1, 14 pages.
Unknown, "AWS Storage Gateway: File gateway for hybrid architectures overview and best practices," Amazon Web Services, Inc., Accessed Dec. 17, 2018, https://d1.awsstatic.com/whitepapers/aws-storage-gateway-file-gateway-for-hybrid-architectures.pdf, 18 pages.
Unknown, "AWS Storage Gateway Faqs," Amazon Web Services, Inc., Accessed Dec. 17, 2018, https://aws.amazon.com/storagegateway/faqs/, 27 pages.
Bender, et al., "Cache-Oblivious Streaming B-Trees," In Proceedings of the Nineteenth Annual ACM Symposium on Parallel Algorithms and Architectures, SPAA '07, Jun. 9-11, 2007, 12 pages.
Brodal, et al., "Lower Bounds for External Memory Dictionaries," Alcom-FT Technical Report Series, ALCOMFT-TR-03-75, Accessed Dec. 17, 2018, http://tildeweb.au.dk/au121/papers/alcomft-tr-03-75.pdf, 13 pages.
Chang, et al., "Bigtable: A Distributed Storage System for Structured Data," Google, Inc., Accessed Dec. 18, 2018, https://static.googleusercontent.com/media/research.google.com/en//archive/bigtable-osdi06.pdf, 14 pages.
Unknown, "Welcome to RocksDB," GitHub, Inc., Sep. 7, 2017, https://github.com/facebook/rocksdb/wiki/Open-Projects, 6 pages.

Unknown, "Storage Engine," DataStax, Inc., Oct. 17, 2018, http://docs.datastax.com/en/cassandra/2.1/cassandra/dml/dml_manage_ondisk_c.html, 1 page.
Unknown, "Google Cloud Storage Documentation," Google, Inc., Accessed Dec. 18, 2018, https://cloud.google.com/storage/docs/#, 2 pages.
Unknown, "How Do I Ensure Data Integrity of Objects Uploaded to or Downloaded from Amazon S3?," Amazon Web Services, Inc., Accessed Dec. 18, 2018, https://aws.amazon.com/premiumsupport/knowledge-center/data-integrity-s3/, 7 pages.
Unknown, "ObjectiveFS: A Shared Distributed Posix File System Backed by an Object Store," Amazon Web Services, Inc., Accessed Dec. 19, 2018, https://objectivefs.com, 7 pages.
O'Neil, et al., "The Log-Structured Merge-Tree (LSM-tree)," Accessed Dec. 19, 2018, https://www.cs.umb.edu/~poneil/lsmtree.pdf, 32 pages.
Palankar, et al., "Amazon s3 for Science Grids: A Viable Solution?," Accessed Dec. 21, 2018, http://citeseer.ist.psu.edu/viewdoc/download;jsessionid=20ECF0F566448EB9ACED424A739F8CF9?doi=10.1.1.112.9646&rep=rep1&type=pdf, 1 page.
Raju, et al., "PebblesDB: Building Key-Value Stores Using Fragmented Logstructured Merge Trees," Accessed, Dec. 21, 2018, www.cs.utexas.edu/~vijay/papers/sosp17-pebblesdb.pdf, 18 pages.
Unknown, "s3fs: Fuse-Based File System Backed by Amazon s3," GitHub, Accessed Dec. 19, 2018, https://github.com/s3fs-fuse/s3fs-fuse, 4 pages.
Unknown, "SQLite4 LSM Users Guide," SQLite, Accessed Dec. 19, 2018, https://sqlite.org/src4/doc/trunk/www/lsmusr.wik, 18 pages.
Unknown, "YAS3FS: Yet Another s3-backed File System," GitHub, Accessed Dec. 21, 2018, https://github.com/danilop/yas3fs, 11 pages.
Kougkas, et al., "Enosis: Bridging the Semamtic Gap Betweem File-Based and Object-Based Data Models", The International Conference for High Performance Computing, Networking, Storage and Analysis, Workshop: The Eighth International Workshop on Data-Intensive Computing in the Clouds, published 2017, 8 pages.

* cited by examiner

LOCKLESS SYNCHRONIZATION OF LSM TREE METADATA IN A DISTRIBUTED SYSTEM

BACKGROUND

A log-structured merge (LSM) tree provides indexed access to files, including efficient reading of data and immutable writing that eliminates performance costs associated with overwriting specific data locations. However, for an LSM tree to perform well, upkeep processing known as compaction must be performed occasionally as more and more data is introduced. Compaction may require significant system resources when performed, which may negatively affect other operations, such as reading from and writing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for synchronizing a data cache with an associated log-structured merge (LSM) tree file system on an object storage platform is described. Instructions to send a cached data set from the data cache to the LSM tree file system are received. An updated metadata catalog representing a data structure of the LSM tree file system that includes the cached data set is generated, the updated metadata catalog including a parent catalog reference indicating a current metadata catalog and a last-merged catalog reference indicating a first compacted metadata catalog that matches a last-merged catalog reference of the current metadata catalog, wherein the updated metadata catalog is associated with the cached data set. Based on identifying a second compacted metadata catalog generated more recently than a first compacted metadata catalog indicated by the last-merged catalog reference of the updated metadata catalog, a merged metadata catalog representing a data structure of the compacted LSM tree file system based on the second compacted metadata catalog and including the cached data set is generated, the merged metadata catalog including a parent catalog reference indicating the updated metadata catalog and a last-merged catalog reference indicating the second compacted metadata catalog. Based on the generation of the merged metadata catalog, the association between the updated metadata catalog and the cached data set is replaced with an association between the merged metadata catalog and the cached data set. The cached data set and the associated metadata catalog are sent to the LSM tree file system, whereby metadata catalogs of the data cache and the LSM tree file system are synchronized to account for asynchronous compaction of the LSM tree file system.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
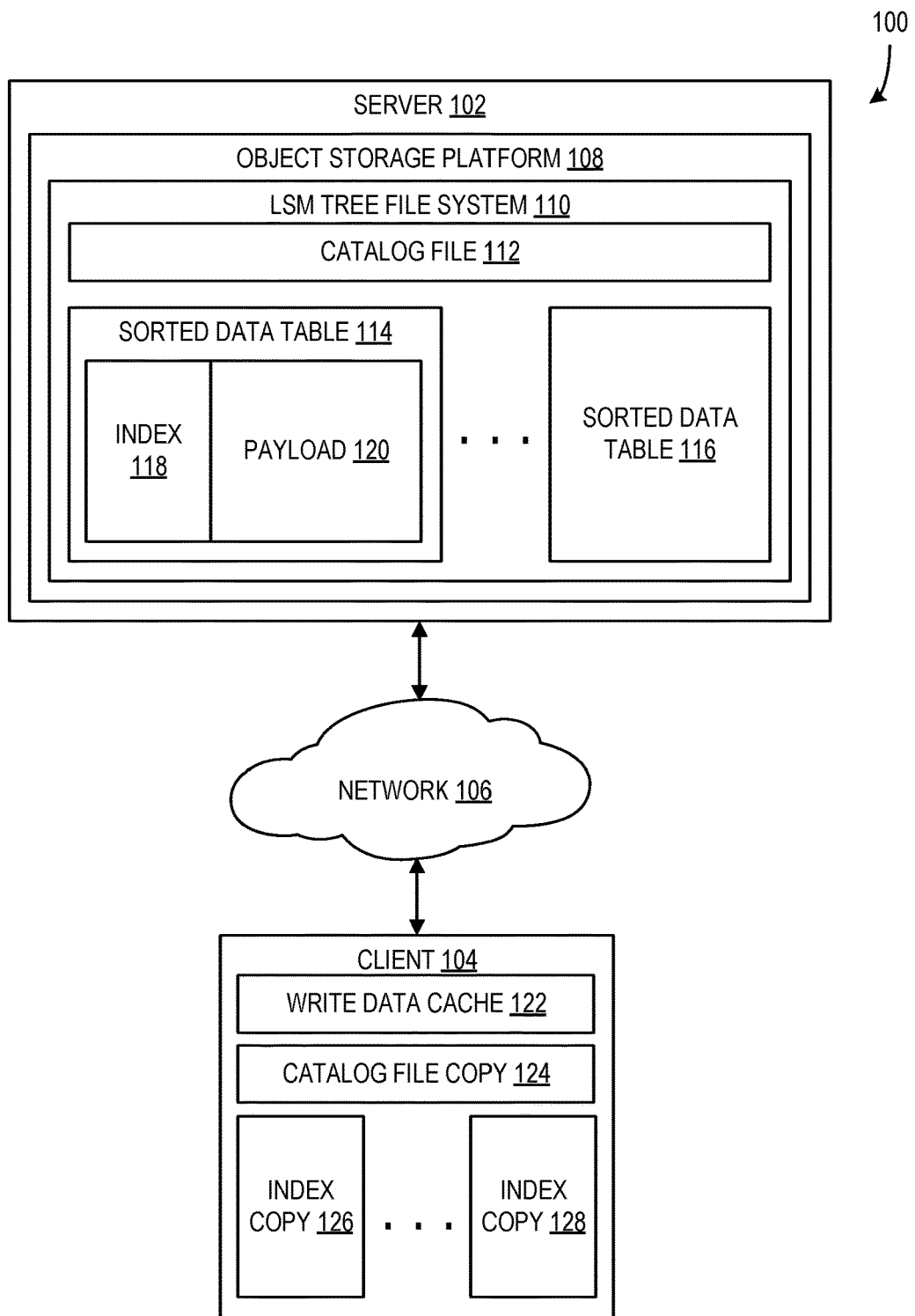
FIG. 1 is an exemplary block diagram illustrating a system configured for storing a providing access to data in on an object storage platform according to an embodiment.

An LSM tree may be used as a file system for an object storage platform. Some issues associated with such an LSM tree file system arrangement may be alleviated through the use of an asynchronous cache that stages data to be written to the LSM tree file system and de-stages the data to the file system in large batches. The cache side performs I/O operations independently from the LSM tree file system, even when the LSM tree file system is in the midst of a compaction process. However, synchronization of the cache and the file system can be difficult. For example, if the cache is out of sync with the file system, accurate reading and writing of data may require additional processing on the LSM tree file system side, reducing the positive effects of implementing the cache. Alternatively, if said processing is performed on the cache side when the cache is out of sync, accurate reading and writing of data to the file system may be essentially impossible after a compaction is performed on the file system, as much of the data may be rearranged.

Aspects of the disclosure provide a computerized method and system for synchronizing a data cache and an LSM tree file system on an object storage platform. When the data cache receives instructions to send a cached data set to the LSM tree file system, an updated metadata catalog that includes the metadata of the current LSM tree file system and metadata associated with the cached data set is generated. The data cache checks if the LSM tree should be compacted and, if so, it sends a compaction instruction to the LSM tree file system. If an unmerged compacted metadata catalog is identified, indicating the updated metadata catalog is out-of-date with respect to the file system, a merged metadata catalog is generated based on the compacted metadata catalog and the cached data set and associated with the cached data set. The cached data set and the associated metadata catalog are sent to the LSM tree file system. In this way, the data cache and LSM tree file system are synchronized without requiring locking or blocking of either entity.

The disclosure operates in an unconventional way by enabling the data cache to operate asynchronously on a different device and/or over a network connection from the LSM tree file system. As a result, the LSM tree file system may be configured as cloud storage for use by local applications, virtual machines, virtual computing instances, or the like on a client device or devices. The disclosure is further configured to localize many data processing operations on the client side that may otherwise occupy significant processing resources in the cloud and/or bandwidth resources associated with a network connection to the cloud. For instance, through the use of the described metadata catalogs, the determination of whether compaction is necessary may be performed locally and, further, mock compaction operations may be performed on locally cached metadata, avoiding relatively large metadata downloads each time compaction is performed on the LSM tree file system.

Additionally, upon detecting that a compaction has been performed, the client-side device and/or software is configured to efficiently identify changes made during compaction based on metadata received from the LSM tree file system and synchronize the locally stored metadata to account for the identified changes (e.g., generate the data locally, without having to download new files). When writing data from the cache to the LSM tree file system, the data cache may provide an up-to-date metadata catalog file that includes the metadata of the new data, enabling the LSM tree file system to quickly update its own metadata files upon receiving the cached data.

FIG. 1 is an exemplary block diagram illustrating a system 100 configured for storing and providing access to data (e.g., payload 120 data, etc.) on an object storage platform 108 according to an embodiment. The system 100 includes a server 102 and a client 104 that are in communication via a network 106. The server includes an object storage platform 108 upon which an LSM tree file system 110 is implemented. In some examples, the server 102 and client 104 are computing devices that include hardware, firmware, and/or software configured to perform the operations described herein as well as other general computing operations. Alternatively, or additionally, the system 100 may include multiple server devices configured as the server 102 and including the object storage platform 108, such that the described data storage is distributed across the multiple server devices. Further, the system 100 may include multiple client devices configured to access the object storage platform 108 as described herein without departing from the description.

The network 106 includes one or more computer networks that are configured to enable network communications between the server 102 and the client 104. It should be understood that communications between components of the system 100 may be performed using network connections on the network 106 as would be understood by a person of ordinary skill in the art of computer networks and communications. The network 106 may include a plurality of networks (e.g., private intranets, public networks such as the Internet, etc.) and/or network types (e.g., wired networks, wireless networks such as Wi-Fi networks or cellular networks, etc.). The network 106 may include any hardware, firmware, and/or software arranged in hierarchies or structures that enable the components of the system 100 to communicate as described without departing from the description herein.

The object storage platform 108 is configured to operate according to object storage principles as would be understood by a person of ordinary skill in the art. The object storage platform 108 may be configured to abstract the storage of the associated data to be exposed and/or managed as objects, which may include the data itself, associated metadata, and/or a unique identifier of the particular object. In some examples, the object storage platform 108 is configured such that overwriting existing data and/or performing many small data writes is relatively expensive (e.g., the platform 108 may not support overwriting, such that changes to one byte of a file may result in the rewriting of the entire file, many small files may be stored as individual objects, resulting in many separate requests for object transfers and other operations, etc.).

The LSM tree file system 110 is implemented on the object storage platform 108, effectively transforming the object storage interface of the platform 108 into a block device interface where block offset values are used as keys of key-value tuples and block content is used as the values of the tuples. The LSM tree file system 110 includes a catalog file 112 and a plurality of sorted data tables 114-116. It should be understood that, while only two sorted data tables are illustrated, the file system 110 may include more, fewer, or different sorted data tables without departing from the description herein. Each sorted data table 114-116 includes an index 118 and a payload 120. It should be understood that the LSM tree file system 110 is configured to adhere to known LSM tree principles unless otherwise specified herein (e.g., the LSM tree file system 110 is optimized for "immutable write", such that edited data is not overwritten, but rather, replacement data is appended to unused space in the file system, etc.), and operates as described herein. In some examples, the catalog file 112 includes up-to-date metadata associated with all sorted data tables 114-116 of the file system 110, such that the catalog file 112 serves as a superblock for the entire file system 110. Such metadata may include unique identifiers of the tables 114-116 and other metadata used to identify locations of data (e.g., identify the sorted data table within which a particular set of data is stored, etc.) within the file system 110 as described herein. The configuration of the catalog file 112 is described in greater detail below with respect to FIG. 2.

In some examples, the LSM tree file system 110 exposes application program interfaces (APIs) for use by other entities, such as the client 104. For instance, the file system 110 may expose a "lookup" API that enables the client 104 to request data based on a provided key value or other location data (e.g., table identifier, offset values, address values, etc.) and an "update" API that enables the client 104 to write or otherwise record data to the file system 110. Such APIs may be configured to perform a portion of or all of the operations as described herein with respect to interacting with the data stored in the file system 110.

It should be understood that, while use of an LSM tree file system is primarily described, in other examples, other types of write optimized tree structures and/or techniques may be used (e.g., cache oblivious look-ahead arrays (COLA), $B^\varepsilon$-trees, fractal cascade trees, copy on write B-trees, etc.).

Further, in some examples, the object storage platform 108 and associated LSM tree file system 110 are configured to be used as a virtual disk by virtual machines or other software entities on the client 104 or other software entities associated with other devices.

Each of the sorted data tables 114-116 (e.g., Sorted String Tables, etc.) store data in the payload 120 and index 118 is configured to provide information about the specific locations of data in the payload 120. In some examples, the LSM tree file system 110 provides access to data in the form of data blocks of uniform size that are indexed by an offset location or address of each data block in the file system (e.g., each data block may be 4 KB in size and indexed by a numeric value that indicates a number of blocks that the data block is offset from the beginning of the file system, etc.). In such a configuration, the index 118 may contain keys that indicate an offset location of the associated data block within the file system and values mapped to the keys that indicate an offset location of the data block within the specific payload 120. Further, in some examples, catalog file 112 and the index 118 and payload 120 of each sorted data table 114-116 may be stored as separate objects with respect to the object storage platform 108. The structure of the sorted data tables 114-116 are described in greater detail below with respect to FIG. 2.

It should be understood that, in some examples, the file system 110 may be configured to include bloom filters that enable the efficient determination of whether a particular data tuple is present in a given sorted data table. However, because the file system 110 includes a catalog file 112 and an index 118 for each sorted data table 114-116, the metadata contained therein may be used to identify the location of a particular data tuple as described herein without using a bloom filter in other examples.

The example client 104 includes a write data cache 122, a catalog file copy 124, and a plurality of index copies 126-128. The write data cache 122 may be installed or otherwise stored on the client 104. The client 104 is configured to use the write data cache 122 when writing data to the file system 110 and the catalog file copy 124 and index copies 126-128 when reading data from the file system 110. In some examples, the client 104 is configured to write data to the write data cache 122 that is intended to be written to the LSM tree file system 110. The client 104 may be configured to only write data values that are new or are being changed to the write data cache 122 rather than, for instance, entire files that are largely the same but include some data values being changed. The write data cache 122 may have an associated capacity threshold and/or an expiration time interval. The client 104 may be configured to send the data in the write data cache 122 when the quantity of data in the cache 122 meets or exceeds the capacity threshold. Additionally, or alternatively, the client 104 may be configured to send the data in the write data cache 122 when the time passed since the last write to the server 102 meets or exceeds the expiration time interval of the cache 122. The capacity threshold and/or expiration time interval may be defined as default values or otherwise set by users of the system 100.

In some examples, the client 104 is configured to use the locally cached catalog file copy 124 and index copies 126-128 to identify locations of data to be read from the file system 110 prior to accessing the server 102. For instance, to read a set of data from a particular location address in the file system 110, the client 104 may search the catalog file copy 124 to identify the sorted data table or tables on which the desired set of data is stored and search the index copies 126-128 associated with the identified sorted data table or tables for offset locations of the set of data within the identified tables. The client 104 may use the identified tables and associated offset locations to request the desired set of data from the file system 110 on the server 102. Such use of the catalog file copy 124 and/or index copies 126-128 may reduce the relative resource costs associated with performing the search operations and read operations in the file system 110 on the server 102.

Further, the client 104 may be configured to maintain up-to-date versions of the catalog file copy 124 and index copies 126-128 by retrieving or otherwise receiving catalog file data and index data from the server 102 on a periodic basis and/or when triggered by occurrence of defined events. In some examples, the client 104 may retrieve or otherwise receive updated versions of the catalog file 112 from the server 102 and, based on the metadata structure defined by the most recently received catalog file version, generate up-to-date index copies 126-128. Alternatively, or additionally, the client 104 may be configured to generate updated versions of the catalog file copy 124 and/or index copies 126-128 based on the data stored in the write data cache 122 and, upon writing the data of the write data cache 122 to the LSM tree file system 110, the updated version of the catalog file copy 124 may be provided to the server 102. This process is described in greater detail below with respect to FIGS. 3A-C, 4, and 5. Further, other methods for maintaining up-to-date versions of the catalog file 112 are operable with the present disclosure.

In some examples, the system may be configured to provide additional features, such as compression, checksum verification, encryption, or the like. For instance, the client 104 may be configured to compress data in a manner understood by a person of ordinary skill in the art prior to sending it to be written in the LSM tree file system 110. Such compression may require that the associated indexes (e.g., index 118, etc.) be configured to account for the compressed size.

Alternatively, or additionally, the LSM tree file system 110 may be configured to include checksums for the data being stored in the sorted data tables 114-116. Such checksums may be generated per block or based on another data unit size and the checksums may be stored in the index 118 of the associated sorted data table 114. Later, when data is ready by the client 104, the checksum in the index 118 may be verified according to methods understood by a person of ordinary skill in the art.

In further examples, the system 100 may be configured to provide encryption of data being stored on the LSM tree file system 110. For instance, the client 104 may be configured to encrypt data according to any known technique prior to writing the data to the LSM tree file system 110 and to decrypt the data according to the associated decryption technique after it is retrieved from the LSM tree file system 110. Because the file system 110 and object storage platform 108 are largely agnostic regarding the arrangement of the data therein, so long as the client 104 is configured to perform the encryption and decryption operations, other operations (e.g., the server-side operations) may be performed in the same manner as described herein.

Figure 2:
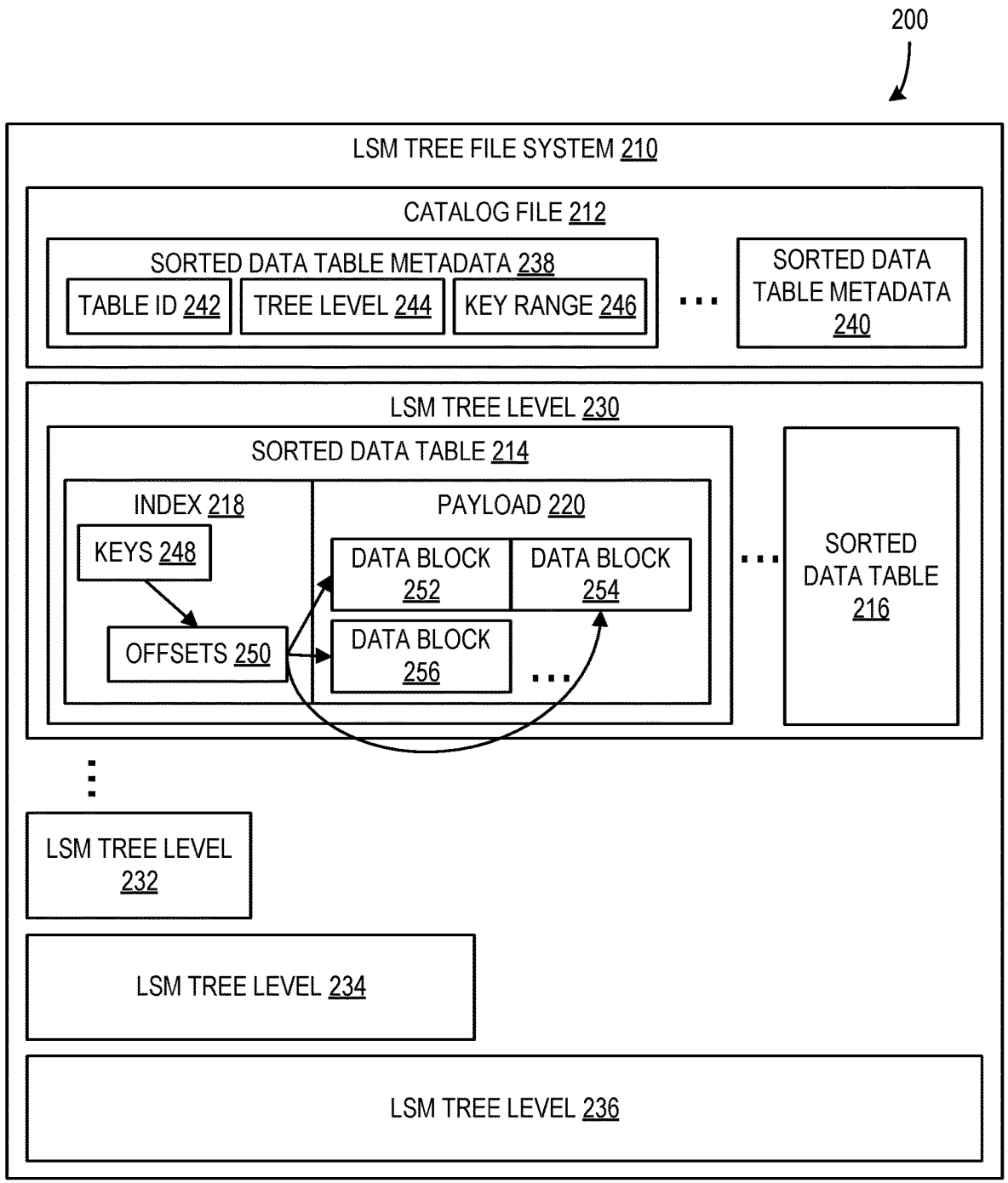
FIG. 2 is an exemplary block diagram illustrating a configuration of an LSM tree file system for use on an object storage platform according to an embodiment.

FIG. 2 is an exemplary block diagram illustrating a configuration of an LSM tree file system 210 for use on an object storage platform (e.g., object storage platform 108, etc.) according to an embodiment. The LSM tree file system 210 includes a catalog file 212 and a plurality of sorted data tables 214-216 as described herein. The plurality of sorted data tables 214-216 are organized in a plurality of LSM tree levels 230-236 according to known LSM tree characteristics.

The catalog file 212 includes sorted data table metadata 238-240 associated with each of the sorted data tables 214-216. Each sorted data table metadata 238-240 includes at least a table ID 242, a tree level 244, and a key range 246. The table ID 242 is a unique identifier within file system 210 for the associated sorted data table 214. It may be in the form of a code, a name, or any other practical form of identifier without departing from the description. The tree level 244 is a value that indicates the level (e.g., LSM tree levels 230, 232, 234, or 236, etc.) on which the associated sorted data table is currently located. The LSM tree levels 230-236 are described in greater detail below, but it should be understood that the tree levels 230-236 are generally configured as levels or rows of data according to known LSM tree principles as would be understood by a person of ordinary skill in the art. The key range 246 of a sorted data table indicates a range of keys (e.g., offsets or addresses of the file system, etc.) for which data is stored in the associated sorted data table. For instance, if a sorted data table includes data with keys from offset 100 to offset 150 in the file system, the key range 246 of the sorted data table may be configured to indicate the range from 100-150. Key ranges 246 may include a first key and a total number of keys or an endpoint key to express a continuous key range. Alternatively, or additionally, if a sorted data table includes multiple ranges of contiguous keys, the key range 246 may be configured to include each range (e.g., 100-150; 225-260; 300-380, etc.). In some examples, the catalog file 212 may be in the form of, for instance, a JavaScript Object Notation (JSON) file including the described metadata values.

The LSM tree file system 210 is configured to arrange sorted data tables 214-216 in one or more LSM tree levels 230-236. It should be understood that, while sorted data tables 214-216 are illustrated as part of the LSM tree level 230, all the tree levels 230-236 may include one or more sorted data tables 214-216 without departing from the description herein. Further, it should be understood that the file system 210 may include more, fewer, or different tree levels than those illustrated without departing from the description herein.

The LSM tree levels 230-236 are interrelated according to a hierarchy according to LSM tree principles. In some examples, the tree level 230 is the "top" level. All data written to the file system 210 is initially written to one or more sorted data tables 214 in the top level 230. The lower levels 232-236 are created and/or populated with sorted data tables 214-216 when data from the top level and other relatively "higher" levels undergo a "compaction" process, which is known in the art with respect to general LSM trees. Compaction may be performed when a tree level reaches a defined capacity threshold of sorted data tables and/or based on a defined time interval expiring. In some examples, compaction results in one or more sorted data tables 214-216 on the top level 230 being combined or merged into a single sorted data table and appended to the next level (e.g., LSM tree level 232, etc.) of the LSM tree file system 210.

Further, while the top level 230 may include sorted data tables with overlapping key ranges, the compaction process results in such overlapping sorted data tables being merged, such that none of the other levels of the LSM tree file system 210 includes sorted data tables with overlapping key ranges. Further, the sorted data tables 214-216 in levels of the file system below the top level may be arranged in key order.

Additionally, each tree level of the LSM tree file system 210 may be configured to be exponentially or otherwise substantially larger than the tree level immediately above it (e.g., as illustrated by the variable width of LSM tree levels 232, 234, and 236, etc.). Due to this substantial increase in capacity from higher level to lower level, large quantities of data may be stored and managed in the LSM tree file system 210 using relatively few total tree levels. It should be understood that this aspect of the LSM tree file system 210 is generally based on known LSM tree principles and the capacity sizes of the various tree levels 230-236 may be set to any values in accordance with known LSM tree principles without departing from the description.

Each sorted data table 214-216 includes an index 218 and a payload 220 as described herein. Each index 218 includes keys 248 mapped to offsets 250 of data blocks 252-256 in the associated payload. Thus, there is a key 248 in the index 218 associated with each data block 252-256 in the payload 220 of a sorted data table 214. In some examples, the data blocks 252-256 are sorted in key order (e.g., lowest associated key 248 to highest associated key 248, etc.). The offset 250 for each key 248 indicates the offset location of the associated data block 252-256 within the payload 220. For instance, in a system where keys 248 are block offsets or addresses within the greater file system 210, a data block 252 associated with a key 248 of 2000 (e.g., the 2000$^{th}$ data block of the greater file system 210, etc.) may have an offset 250 of zero if it is the first data block in the payload 220 of the associated sorted data table 214. Thus, to access the data at offset 2000 of the file system 210, the key 248 that includes the value "2000" is found in the index 218, the mapped offset 250 of "0" is identified, and that offset 250 is used to find the location of the data block 252 in the payload 220.

In some examples, data blocks 252-256 may be configured to include associated keys 248 as well as payload data. For instance, a data block's key 248 may be located in the first data location of the data block based on the associated offset 250.

Figure 3A:
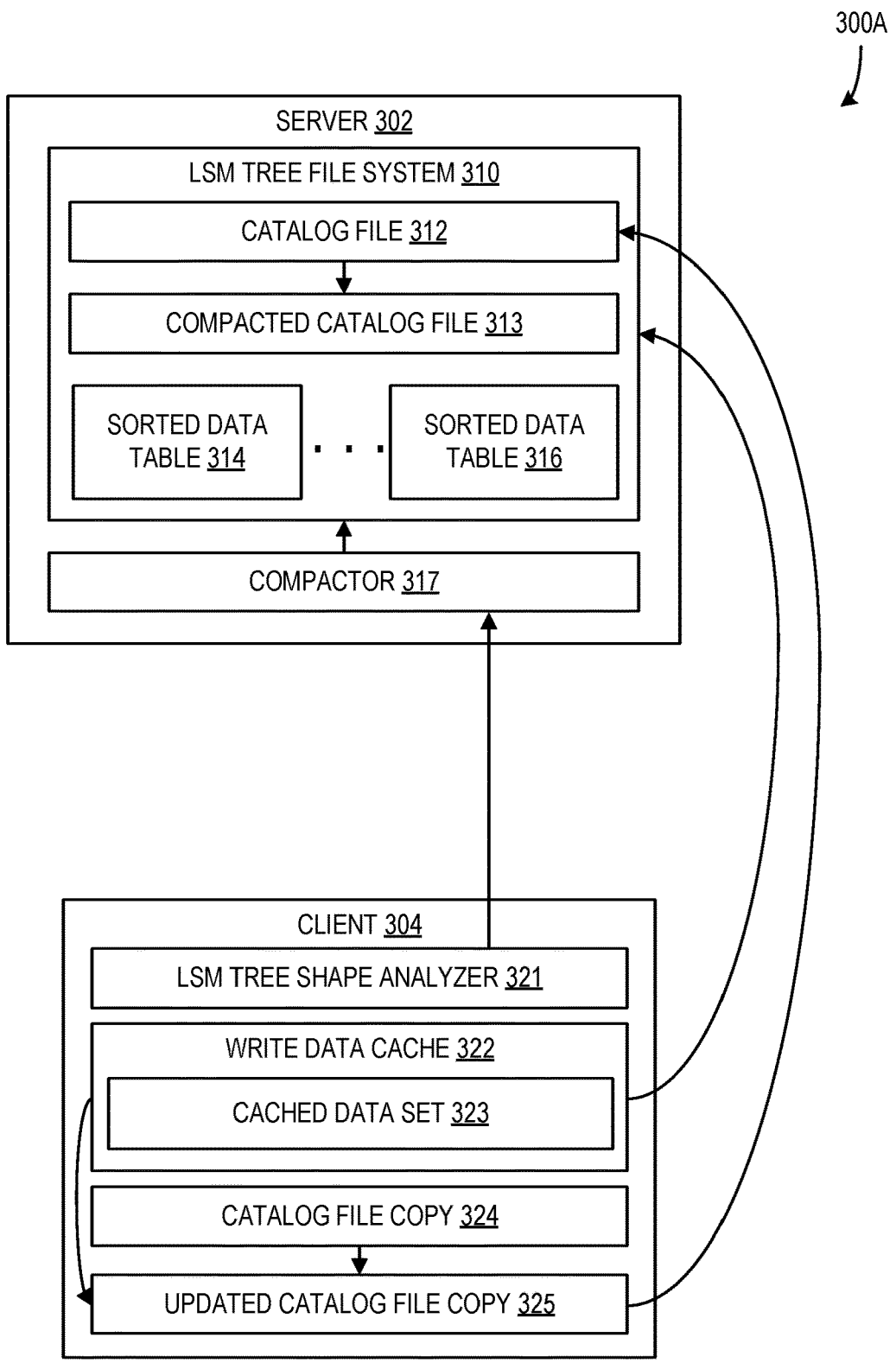
FIGS. 3A-C are exemplary block diagrams illustrating synchronization of catalog files between an LSM tree file system and data caching client based on compaction of the LSM tree according to an embodiment.
Figure 3B:
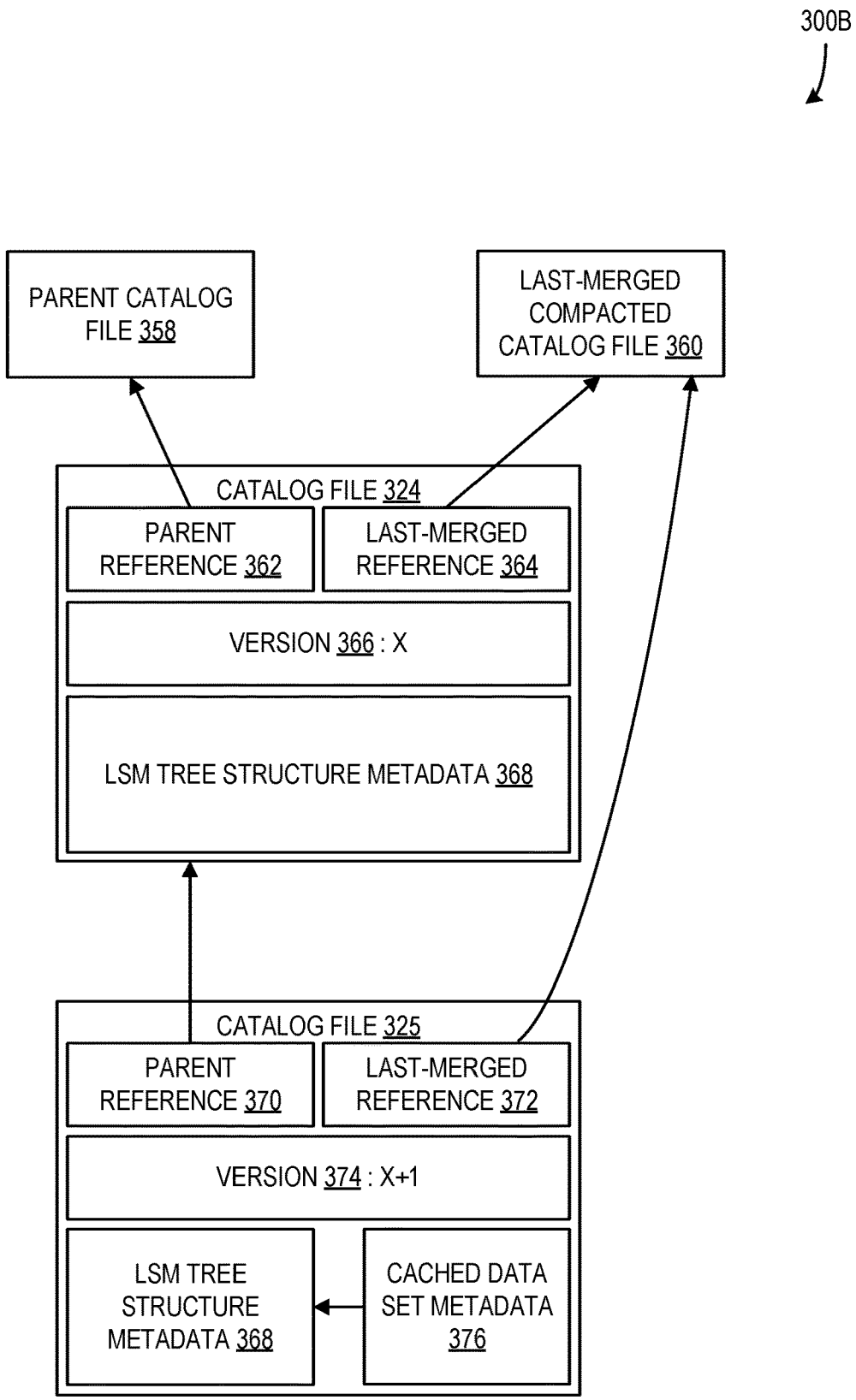
Figure 3C:
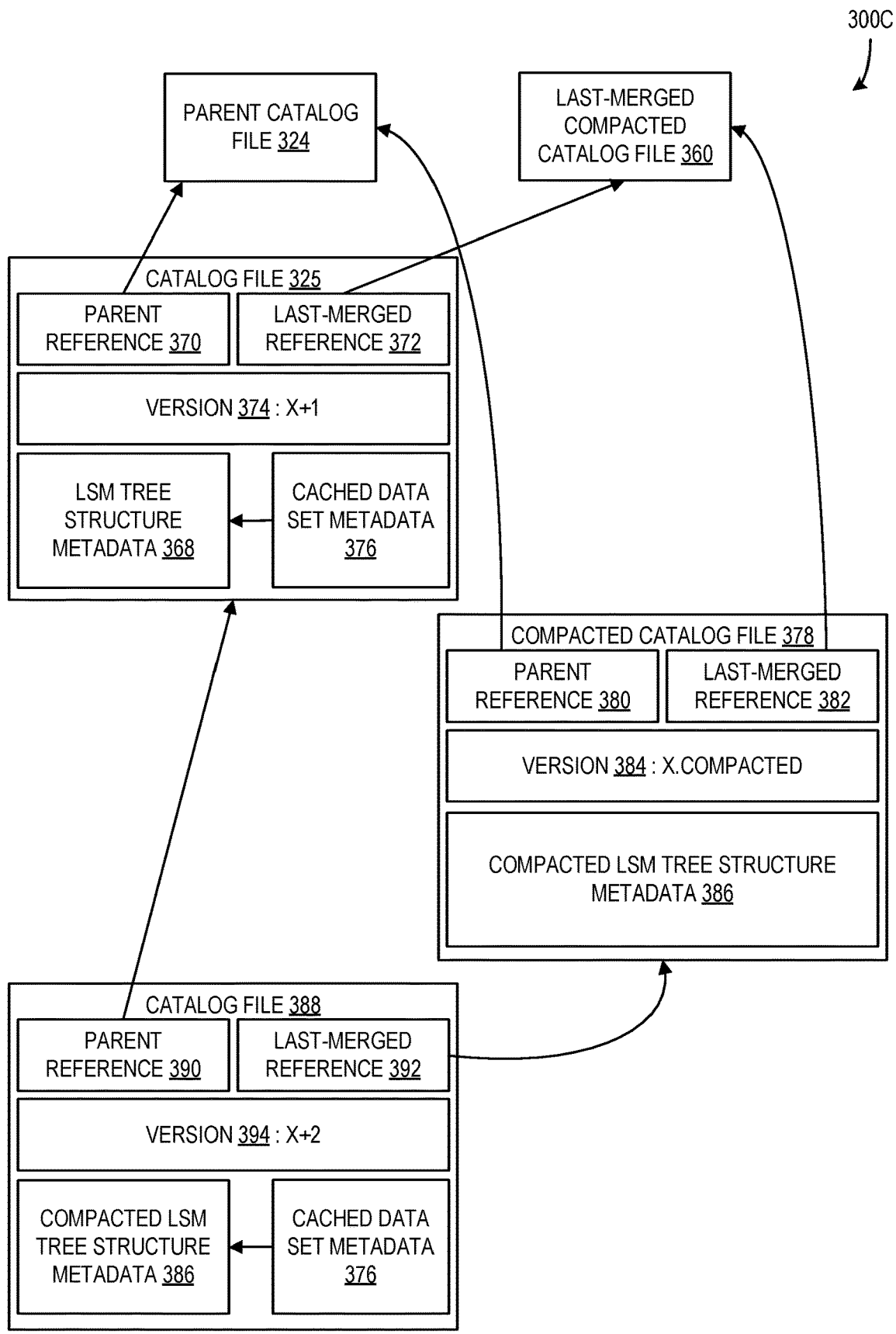

FIGS. 3A-C are exemplary block diagrams illustrating synchronization of catalog files between an LSM tree file system and data caching client based on compaction of the LSM tree according to an embodiment. The data caching client and LSM tree file system are enabled to asynchronously operate and synchronize catalog files in a lockless manner as described herein. In the system 300A of FIG. 3A, the server 302 includes the LSM tree file system 310 as described above and the client 304 includes a write data cache 322 and catalog file copy 324 as described above. It should be understood that the server 302 and client 304 may further include other components not pictured as described above with respect to FIGS. 1 and 2.

The server 302 further includes a compactor 317 component that includes hardware, firmware, and/or software configured to perform compaction operations on the LSM tree file system 310. It should be understood that the compaction operations performed may be based on known LSM tree compaction principles as previously mentioned; however, differences such as the entity performing the LSM tree compaction operations are described herein. For instance, sorted data tables (e.g., sorted data tables 314-316) of the top level and/or other levels (e.g., LSM tree levels 230-236) of the LSM tree may be transformed into sorted data tables on a lower level that are merged (e.g., sorted data tables with continuous key ranges of data tuples are formed from one or more sorted data tables to be compacted, etc.) and ordered (e.g., the sorted data tables are organized in an order based on the key range and no sorted data tables have overlapping key ranges, etc.), and duplicate data of the transformed sorted data tables may be eliminated (e.g., data tuples with more than one entry in the sorted data tables to be compacted are reduced to a single tuple that includes the most recent data values associated with the data tuples, etc.). The compactor 317 is configured to perform a compaction operation on levels of the LSM tree file system 310 that are "out of shape" (e.g., levels that exceed associated level capacities, etc.).

The compactor 317 is configured to generate a compacted catalog file 313 from the catalog file 312 based on a performed compaction. Because the catalog file 312 includes the metadata that describes the structure of the LSM tree, after compaction, that metadata is updated, converting the catalog file 312 to the compacted catalog file 313. Updates may include adding new sorted data table metadata (e.g., new identifiers associated with levels and key range, etc.), adjusting levels of current sorted data tables (e.g., changing a level indicator associated with a sorted data table identifier to represent the movement of the associated table to the new level, etc.), and/or removing tables from the metadata (e.g. a sorted data table may be absorbed into another new sorted data table upon compaction such that it may be removed from the catalog file, etc.).

In some examples, the compactor 317 receives instructions that indicate a level or levels to compact and a target level upon which to place the compacted data. Alternatively, or additionally, the compactor 317 may be configured to receive a compaction indicator and, as a result of the indicator, determine levels to compact and target levels upon which to place the compacted data based on known LSM tree principles. Further, the compactor 317 may be configured to immediately perform compaction upon receiving instruction or indication to do so or, alternatively, queue a compaction event based on the received instruction or indication. Queued compaction events may be performed by the compactor 317 based on one or more compaction event requirements being met. For instance, if no compacted metadata catalog file 313 exists, a queued compaction event may be the first compaction and may be performed immediately. Further, a queued compaction event may be held in the queue until the compactor 317 confirms that the most recent previous compacted metadata catalog file 313 has been used by the client 304 to ensure that all compaction is done in an appropriate order. Such compaction event requirements are described in greater detail below.

The client 304 further includes an LSM tree shape analyzer 321. The LSM tree shape analyzer 321 includes hardware, firmware, and/or software configured to analyze the structure of the LSM tree file system 310 based on the catalog file copy 324 and/or updated catalog file copy 325 to determine whether to send a compaction instruction to the compactor 317. In some examples, the LSM tree shape analyzer 321 compares the current number of sorted data tables in each level of the LSM tree to level capacity limits that are defined for each level. Upon identifying one or more levels that exceed the associated level capacity limits (e.g., levels that are "out of shape", etc.), the analyzer 321 may cause a compaction instruction to be sent to the compactor 317. The instruction may include an indicator to perform a compaction, identifiers of the one or more levels that are "out of shape", and/or any other data that may be used by the compactor 317 in the compaction.

The client 304 is further configured to generate an updated catalog file copy 325 from the catalog file copy 324 based on the cached data set 323 in the write data cache 322. Generating the updated catalog file copy 325 may include determining sorted data table metadata associated with the cached data set 323 and adding the determined metadata to the catalog file copy 324 (e.g., via converting the cached data set 323 into one or more sorted data tables and identifying the associated identifiers, key ranges, and the like, etc.), associating the newly added sorted data table metadata with the top level of the LSM tree structure. The generation of the updated catalog file copy 325 may be triggered based on the client 304 preparing to send the cached data set 323 to the LSM tree file system 310 for storage. Alternatively, or additionally, other events or operations of the client 304 may trigger the generation of the updated catalog file copy 325 without departing from the description here.

The client 304 is configured to send the cached data set 323 from the write data cache 322 in sorted data table format to the LSM tree file system 310 for storage. In some examples, the client 304 includes the updated catalog file copy 325 with the cached data set 323, whereby the server is enabled to use the updated catalog file copy 325 as a current catalog file 312 once the cached data set 323 is written to the file system 310 as sorted data tables.

In some examples, the server 302 and/or client 304 track and maintain version information associated with the catalog files 312, 313, 324, and 325. FIG. 3B illustrates, in system 300B, the structure and relationship between the catalog file 324 and the catalog file 325 based on associated version data and references to ancestor catalog files according to an embodiment. The catalog file 324 includes a parent reference 362 and a last-merged reference 364. The references 362 and 364 include identifiers of the associated catalog files, pointers or address references to the associated catalog files, and/or version data that may be used to identify the associated catalog files. Catalog file 324 refers to a parent catalog file 358 by parent reference 362 and a last-merged compacted catalog file 360 by last-merged reference 364. The catalog file 324 further includes a version 366 entry that indicates that catalog file 324 is version X of a catalog file associated with the LSM tree file system 310. The catalog file 324 includes the LSM tree structure metadata 368 (e.g., sorted data table metadata 238-240, etc.).

Upon generation of the updated catalog file 325 from the catalog file 324, the parent reference 370 is defined as referring to the catalog file 324 as the parent catalog file. The last-merged reference 372 is defined as referring to the same file as the last-merged reference 364 of the catalog file 324, which is the last-merged compacted catalog file 360. The last-merged reference 364 may be used in the system to determine when compaction is performed, etc. as described in greater detail below.

The catalog file 325 further includes a version 374 of X+1, which is an incremented version value from the catalog file 324 and LSM tree structure metadata 368 that is updated to include the cached data set metadata 376 (e.g., based on the cached data set 323, etc.) as described. The changes made to the metadata by including the cached data set metadata 376 represents the structural changes to be made to the LSM tree file structure upon the cached data set being written to the file structure.

FIG. 3C illustrates, in system 300C, the structure and relationship between the catalog file 325, a compacted catalog file 378, and a catalog file 388 based on associated version data and references to ancestor catalog files according to an embodiment. The catalog file 325 is in substantially the same state as illustrated above in FIG. 3B. Upon generation of the catalog file 325, the associated client 304 may determine that a compacted catalog file 378 exists that is more recent than the last-merged compacted catalog file 360 to which the last-merged reference 372 refers. As a result, the LSM tree structure metadata 368 of the catalog 325 is not synchronized with the LSM tree structure of the file system (e.g., LSM tree structure file system 310 on the server 302, etc.) due to compaction operations. In order to synchronize the contents, the catalog file to be sent with the cached data set catalog file 388 is generated.

As with catalog files 324 and 325 described above, the compacted catalog file 378 and catalog file 388 include parent references 380 and 390, last-merged references 382 and 392, versions 384 and 394, respectively. When a compacted catalog file 378 is generated (e.g., the generation of compacted catalog file 313 in FIG. 3A, etc.), the version 384 is assigned a value that includes the version number or indicator of the parent catalog file 324 to which the parent reference 380 refers combined with an indicator that the catalog file includes compacted LSM tree structure metadata 386 that reflects changes made to the LSM tree during compaction operations. As illustrated, the version 384 of the compacted catalog file 378 is "X.compacted". However, it should be understood that other indicators of compaction may be used without departing from the description herein. The last-merged reference 382 may refer to the previously generated compacted catalog file (e.g., last-merged compacted catalog file 360, etc.). However, in some examples, the last-merged reference 382 of a compacted catalog file 378 may remain blank or null, as the "last-merged" relationship may not be used with compacted catalog files.

The catalog file 388 may be generated to include a parent reference 390 that refers to the previously generated catalog file 325 to maintain a consistent sequence of versions and a last-merged reference 392 that refers to the compacted catalog file 378. The version 394 of the catalog file 388 is "X+2", which is incremented from the version 374 of catalog file 325. The metadata stored in the catalog file 388 is the compacted LSM tree structure metadata 386 from the compacted catalog file 378 with included cached data set metadata 376. The cached data set metadata 376 is included in the compacted LSM tree structure metadata 386 in substantially the same manner as described above with respect to including metadata 376 in the LSM tree structure metadata 368.

In some examples, multiple catalog files may have been generated in the interval between the generation of the compacted catalog file 378 and the generation of previous compacted catalog file 360 (e.g., there are intervening catalog files between the parent catalog file 324 and the catalog file 325, such that the version of the updated catalog file 325 is more than one greater than the version of the parent catalog file of the compacted catalog file 378, etc.). In that case, the merged catalog file 388 is generated to include the compacted LSM tree structure metadata 386 with included metadata from each of the previously generated catalog file versions that are more recent than the parent catalog file of the compacted catalog file 378. In order to determine the set of metadata to include in the merged catalog file 388, the metadata of the parent catalog file of the compacted catalog file 378 is compared to the metadata of the updated catalog file 325 and metadata associated with cached data sets of the intervening catalog files that have been generated since the generation of the parent catalog file are merged with the compacted LSM tree structure metadata 386 in the merged catalog file 388. Because cached data sets are only appended to the top row of the LSM tree outside of compaction, the differences may be efficiently identified by comparing the metadata of the top row of the LSM tree for newly included sorted data tables.

Figure 4:
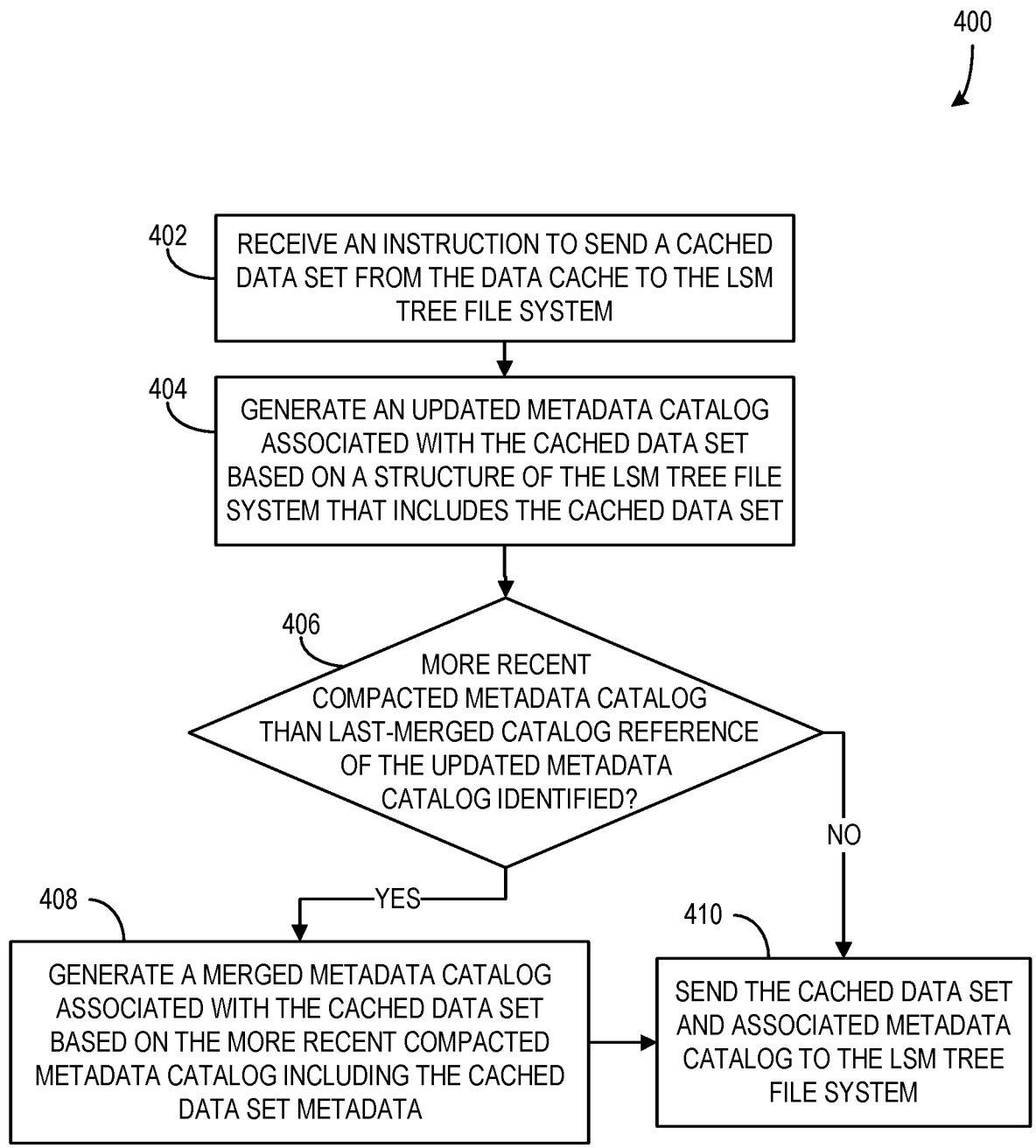
FIG. 4 is an exemplary flow chart illustrating a method of synchronizing a data cache with an associated LSM tree file system according to an embodiment.

FIG. 4 is an exemplary flow chart illustrating a method 400 of synchronizing a data cache (e.g., write data cache 122, 322, etc.) with an associated LSM tree file system (e.g., LSM tree file system 110, 210, 310, etc.) according to an embodiment. It should be understood that the method 400 may be implemented and/or performed by a system configured as described above in FIGS. 1, 2, and 3A-C. At 402, an instruction is received to send a cached data set from the data cache to the LSM tree file system. For instance, an application, program, or other entity of the client device may communicate with the client device to send an instruction to "de-stage", or send, the cached data that is currently staged in the data cache. Alternatively, or additionally, entities from outside the client 104 may send such instructions (e.g., an application or program on the server 102 may request data to be sent, a user may communicate instructions to send the cached data via another device in network communication with the client 104, etc.). The received instruction may indicate that all the cached data staged in the data cache should be sent or, alternatively, the instruction may indicate a subset of the cached data to be sent. Further, the instruction may indicate a target to which the cache data to be sent in systems where there may be more than one server device, more than one object storage platform, and/or more than one LSM tree file system.

At 404, an updated metadata catalog (e.g., updated catalog file copy 325, etc.) is generated. The updated metadata catalog is associated with the cached data set to be sent and based on a structure of the LSM tree file system that includes the cache data set. The structure of the LSM tree file system is determined based on metadata in the current metadata catalog (e.g., catalog file copy 124,324, etc.) stored by the client 104. The updated metadata catalog further includes a parent catalog reference (e.g., parent reference 370, etc.) that refers to the current metadata catalog and a last-merged catalog reference (e.g., last-merged reference 372, etc.) that refers to a compacted metadata catalog that matches the last-merged catalog reference of the current metadata catalog. The updated metadata catalog may be associated with the cached data set, such that, when the cached data set is sent, the updated metadata catalog may be sent to the LSM tree file system with the cached data set. Further, the updated metadata catalog may be assigned a version number or value that is incremented from a version number or value of the current metadata catalog, as described above. In alternative examples, different version tracking may be used without departing from the description herein.

It should be understood that the metadata of the updated metadata catalog includes metadata for the cached data set in sorted data table format as described herein. The metadata of the cached data set may be included and associated with a top level of the LSM tree file structure, representing that the cached data set will be appended to the top level of the LSM tree file structure according to known LSM tree principles.

In some examples, the levels of the LSM tree file system are analyzed (e.g., by LSM tree shape analyzer 321, etc.) to determine whether any levels exceed level capacity thresholds. The levels may be analyzed based on the associated metadata in the current metadata catalog, enabling the client device to perform the analysis without directly accessing the LSM tree file system. In some examples, the analysis includes comparing a number of sorted data tables in each level of the LSM tree with level capacity thresholds associated with each respective level. Because each level down the LSM tree increases in capacity exponentially or to an otherwise significant degree based on LSM tree principles, data from higher levels that exceed the associated capacities may be sorted and transferred to lower levels that have remaining capacity via a compaction process as described herein.

Such a compaction process may be caused to be performed on the LSM tree file system. In some examples, the client device may send a compaction message or instruction to the LSM tree file structure on the associated server device as described above with respect to FIG. 3A. Alternatively, or additionally, shape analysis of the LSM tree file structure may be performed on the server device and a compaction process may be triggered based on that analysis and/or other factors. Such analysis may be scheduled on a time interval and/or triggered based on defined events or satisfaction of defined requirements. For instance, analysis of LSM tree shape and associated compaction may be initiated on the server device by a lambda function that is triggered whenever new data is uploaded from a client device.

At 406, the most recent compacted metadata catalog is checked to determine if it is more recent than the catalog referenced by the last-merged catalog reference of the updated metadata catalog. If so, the process proceeds to 408. If not, the process proceeds to 410. In some examples, to check on the most recent compacted metadata catalog, the client device may request the most recent compacted metadata catalog from the server device, as compacted metadata catalogs are generated by the server device based on compaction processes as described above. Upon retrieving the most recent compacted metadata catalog from the server device, the client device may compare a catalog identifier or version of the retrieved catalog with the last-merged catalog reference of the current or updated metadata catalog.

In some examples, the client device may retrieve only the version or identifier of the most recent compacted metadata catalog. Because the compaction process is a determinative process, the client device may be configured to generate a copy of the most recent compacted metadata catalog from the parent catalog of the most recent compacted metadata catalog, which may be indicated in the version of the compacted metadata catalog as described above. The client device may perform a mock compaction process on the parent catalog to generate the most recent compacted metadata catalog from the version of that catalog (e.g., the client device may alter the metadata of the parent metadata catalog to represent the changes to the file system that occurred when the compaction process was performed on the file system and the most recent compacted metadata catalog was generated, etc.).

At 408, a merged metadata catalog (e.g., catalog file 388) is generated. The merged metadata catalog is based on the metadata of the most recent compacted metadata catalog and metadata associated with the cached data set to be written to the LSM tree file structure. Further, the merged metadata catalog includes a parent catalog reference to the updated metadata catalog and a last-merged catalog reference to the most recent compacted metadata catalog. In some examples, the merged metadata catalog is assigned a version that is incremented from the version of the updated metadata catalog as described above. Alternatively, the version of the merged metadata catalog may be set to the version of the updated metadata catalog and the updated metadata catalog may be deleted or otherwise removed due to the out-of-date metadata with which it was generated (e.g., the metadata describes the structure of the LSM tree file system prior to the most recent compaction process, etc.). The merged metadata catalog may be associated with the cached data set, replacing the updated metadata catalog.

In some examples, locally cached indexes (e.g., index copies 126-128) may be updated to reflect the changes made to the LSM tree structure during compaction. The client device may be configured to request updated indexes from the server device, but such a request may result in the use of substantial resources. Alternatively, after generating the merged metadata catalog, the client device may perform a mock compaction on the locally cached indexes based on the previous metadata catalog and/or the merged metadata catalog to synchronize them with the merged metadata catalog. It should be understood that locally caching indexes, catalog files, or other components includes storing the components at the client 104 or, alternatively, storing the components separately from the LSM tree file system and apart from or outside of the associated object storage platform. For instance, in some examples, locally cached index copies may be stored and maintained on multiple clients that are separate from the LSM tree file system.

At 410, the cached data set and the associated metadata catalog (e.g., the updated metadata catalog or the merged metadata catalog, depending on the previous operations of the process, etc.) are sent to the LSM tree file system. In some examples, the cached data set and associated metadata catalog are sent from the client device to the server device over a network connection.

Further, in response to the sent cached data set and associated metadata catalog, the server device may write the cached data set to the LSM tree file structure in the form of one or more sorted data tables, appending the sorted data tables to the top of the LSM tree. The server device may also replace the current metadata catalog with the associated metadata catalog, ensuring that the metadata catalog associated with the LSM tree file structure is up-to-date and includes the metadata of the recently added sorted data tables.

Figure 5:
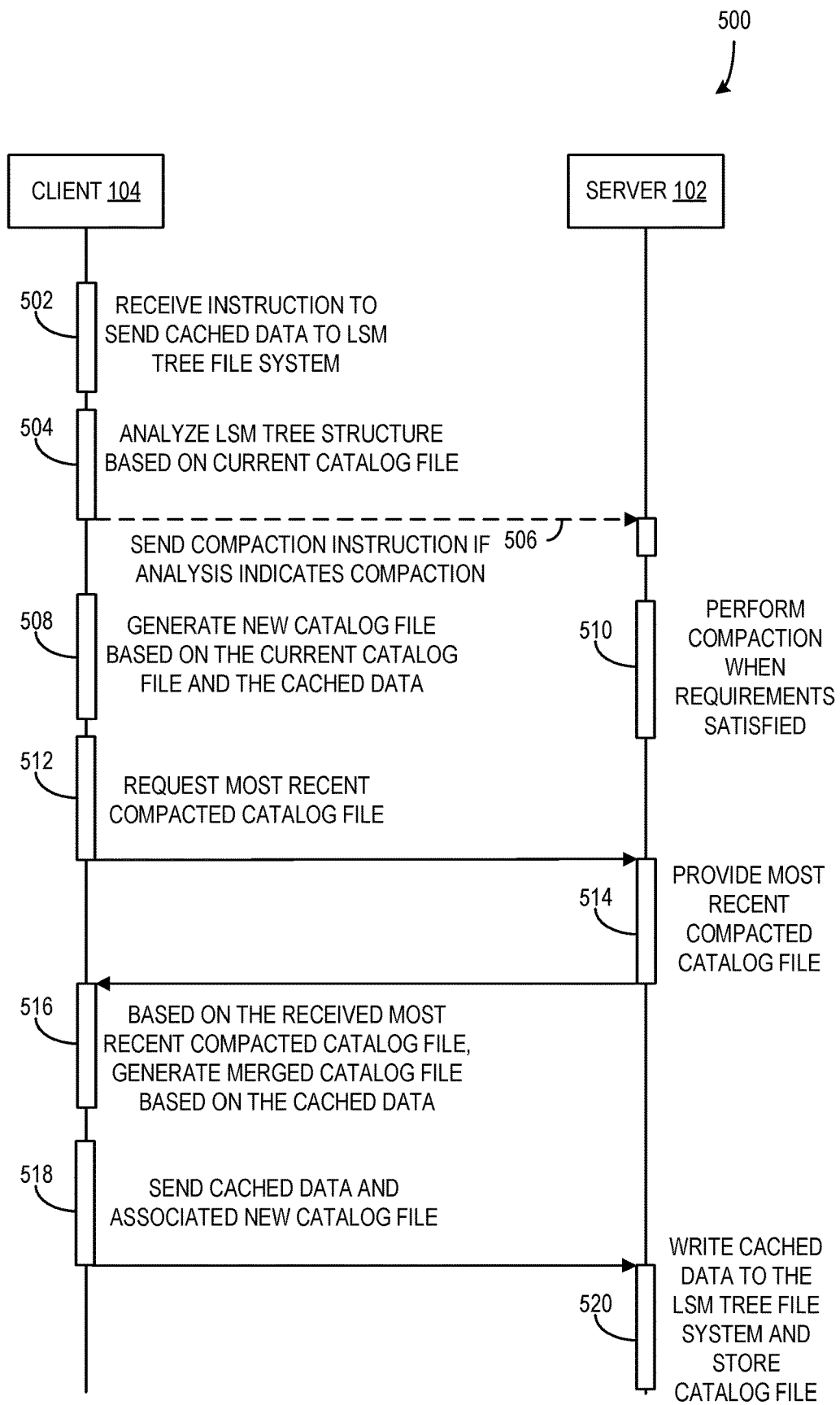
FIG. 5 is an exemplary sequence diagram illustrating operations of a client and server of during synchronization of a data cache with an associated LSM tree file system according to an embodiment.

FIG. 5 is an exemplary sequence diagram 500 illustrating operations of a client and server during synchronization of a data cache with an associated LSM tree file system according to an embodiment. The diagram 500 includes operations substantially similar to the method 400 described above and may be performed by a system configured as described above with respect to FIGS. 1, 2, and 3A-C. It should be understood that the operations of the client 104 may be performed by a first processor or processors of the client 104 and the operations of the server 102 may be performed by second processor or processors of the server 102. At 502, the client 104 receives instructions to send the cached data to the LSM tree file system. At 504, the client 104 analyzes the LSM tree structure based on the current catalog file stored by the client 104. If the analysis indicates that the LSM tree is out of shape and that compaction should be performed, the client 104 sends a compaction instruction to the server 102 at 506.

At 508, the client 104 generates a new catalog file based on the current catalog file and the cached data. The generation of the new catalog file may include assigning references to a parent catalog file and a last-merged catalog file and assigning a version that is incremented from the version of the parent catalog file as described above.

At 510, the server 102 performs a compaction on the LSM tree file structure when compaction requirements are satisfied. It should be understood that compaction may be performed by the server 102 asynchronously and/or in parallel with operations performed by the client 104. While it is illustrated as occurring at substantially the same time as generating the new catalog file, in other examples, the compaction may be performed at other times during the process (e.g., while data is written to the local data cache of the client 104, etc.) without departing from the description herein.

Requirements for compaction may be satisfied when the server 102 determines that the previous compaction changes have been merged with a catalog file of the client 104, as described above. Further, requirements may include performance and/or available resource requirements to perform the compaction. For instance, the server 102 may delay compaction until it determines that there are sufficient processing resources to complete the compaction efficiently. Further, requirements for compaction may be satisfied when server 102 detects another compaction is still on-going.

At 512, the client 104 requests the most recent compacted catalog file from the server 102 and, at 514, the server 102 provides the most recent compacted catalog file. As illustrated, the most recent compacted catalog file is based on the compaction process performed at 510.

At 516, the client 104 generates a merged catalog file based on the received most recent compacted catalog file and the cached data to be sent as described above. In alternative examples, if the client 104 determines that the most recent compacted catalog file has already been merged in a previous catalog file, step 516 of the process may not be performed, as described above with respect to FIG. 4.

At 518, the client 104 sends the cached data and the associated new catalog file to the server 102 and, at 520, the server 102 writes the cached data to the LSM Tree file system and stores the received catalog file as described herein.

In some examples, the server 102 may further perform garbage collection operations during or after compaction operations. The compaction and merging of data in the LSM tree file structure may create duplication of data that is reclaimed through garbage collection when it is determined that the duplicate data is not currently in use by the system. Garbage collection may include collection of sorted data tables (e.g., sorted data tables 114-116, etc.) in the LSM tree file structure, collection of associated catalog files, and/or collection of index copies (e.g., index copies 126-128, etc.) on the client.

Performing garbage collection of sorted data tables may include identifying sorted data tables that are no longer used through the parent catalog references of associated metadata catalogs. For instance, if a parent catalog includes a reference to a sorted data table and a child catalog of the parent catalog (e.g., a metadata catalog that refers to the parent catalog via a parent catalog reference, etc.) does not include a reference to the sorted data table, the sorted data table is considered to be "garbage" and it is flagged for collection (e.g., the data location(s) associated with the flagged sorted data table are freed or otherwise reclaimed for other use by the system, etc.). Using parent catalog references of metadata catalogs to navigate through the various versions of catalog enables garbage collection for sorted data tables of multiple past metadata catalogs in this way.

Further, a "best ancestor" metadata catalog may be determined by identifying the most recent compacted metadata catalog and identifying its parent metadata catalog. Because the compacted metadata catalog includes the same data set as its parent metadata catalog and reflects the structural changes from the compaction process (e.g., duplicate data tuples that have been compacted into a single most recent tuple during compaction, etc.), data that has become "garbage" to be collected during compaction is reflected in metadata differences between the parent metadata catalog and a metadata catalog that has merged in the most recent compacted metadata catalog. For instance, the parent metadata catalog may be compared to the compacted metadata catalog itself or another metadata catalog that refers to the compacted metadata catalog via the associated last-merged catalog reference.

The string of metadata catalogs may be traversed using the parent catalog references of each sequential metadata catalog and "garbage" data may be flagged for each catalog as described above. Once a metadata catalog with a "null" or empty parent catalog reference is identified, the garbage flagging process is complete. All the flagged data locations may be freed or otherwise reclaimed as would be understood by a person of ordinary skill in the art. Further, the metadata catalogs that are processed and are older than a most recent metadata catalog may be removed, freed, or otherwise reclaimed as well.

Locally cached indexes (e.g., index copies 126-128, etc.) may also be reclaimed through garbage collection. After a merged metadata catalog is generated by combining a compacted metadata catalog with metadata of a cached data set as described above, the current locally cached indexes may be rendered inaccurate due to the compaction. Indexes associated with sorted data blocks that the newly merged metadata catalog does not reference may be flagged for removal and/or reclamation.

Additional Example Scenarios

Aspects of the disclosure enable various additional scenarios, such as next described.

In an example, an LSM tree file system is installed on an object storage platform as described herein. The object storage platform is installed on a server which is connected via a network to a client. The client performs I/O operations, including caching data and sending data to the LSM tree file system as described herein. The client receives data from an application and writes it to the data cache to stage it for later transmission to the LSM tree file system. Adding the data to the data cache triggers an instruction to send the currently cached data to the file system based on the total cached data exceeding a cache capacity threshold.

The client analyzes the shape of the LSM tree based on a locally stored metadata catalog file. The analysis indicates that compaction of the LSM tree is not yet necessary. The client generates an updated metadata catalog by merging metadata associated with the cached data set into the locally stored metadata catalog file. The client includes a version indicator in the updated metadata catalog that is incremented from the version indicator of the current locally stored metadata catalog. Further, the client links the new catalog to the current metadata catalog via a parent catalog reference of the new catalog, and links the new catalog to the same compacted metadata catalog to which the current metadata catalog refers via the last-merged catalog reference.

Once the updated metadata catalog is generated, the client requests version information of the most recently generated compacted metadata catalog from the object storage platform server. The client determines that the version of the most recently generated compacted metadata catalog matches the last-merged catalog reference of the updated metadata catalog, so no further merging is required. The client sends the cached data set in sorted data table form with the updated metadata catalog to the LSM tree file system for storage.

In another example, the client again begins the process of writing cached data to the LSM tree file system. The client checks the shape of the LSM tree and determines that compaction should now be performed. The client sends a compaction instruction to the object storage platform server to indicate that compaction is necessary to maintain performance of the LSM tree file system. The server receives the compaction instruction and adds it to a queue. The server checks the most recently received metadata catalog from the client to determine whether the most recent previous compaction changes were included. The metadata catalog does refer to the most recent compacted metadata catalog via a last-merged catalog reference, indicating that the newly queued compaction event may be performed. The server proceeds with the compaction.

Meanwhile, the client generates an updated metadata catalog as described herein. After generating the updated metadata catalog, the client requests version information regarding the most recent compacted metadata catalog. The server has since completed the compaction, such that the version data requested by the client does not match the last-merged catalog reference of the updated metadata catalog. As a result, the client proceeds to merge the metadata of the cached data set with the metadata of the most recent compacted metadata catalog to form a new merged metadata catalog. The merged metadata catalog refers to the previously generated metadata catalog via a parent catalog reference and to the most recent compacted metadata catalog via the last-merged catalog reference, indicating that that compaction has been accounted for by the client and that the metadata catalogs of the client and server are in sync. The client sends the cached data set to the server along with the merged metadata catalog.

Exemplary Operating Environment

Figure 6:
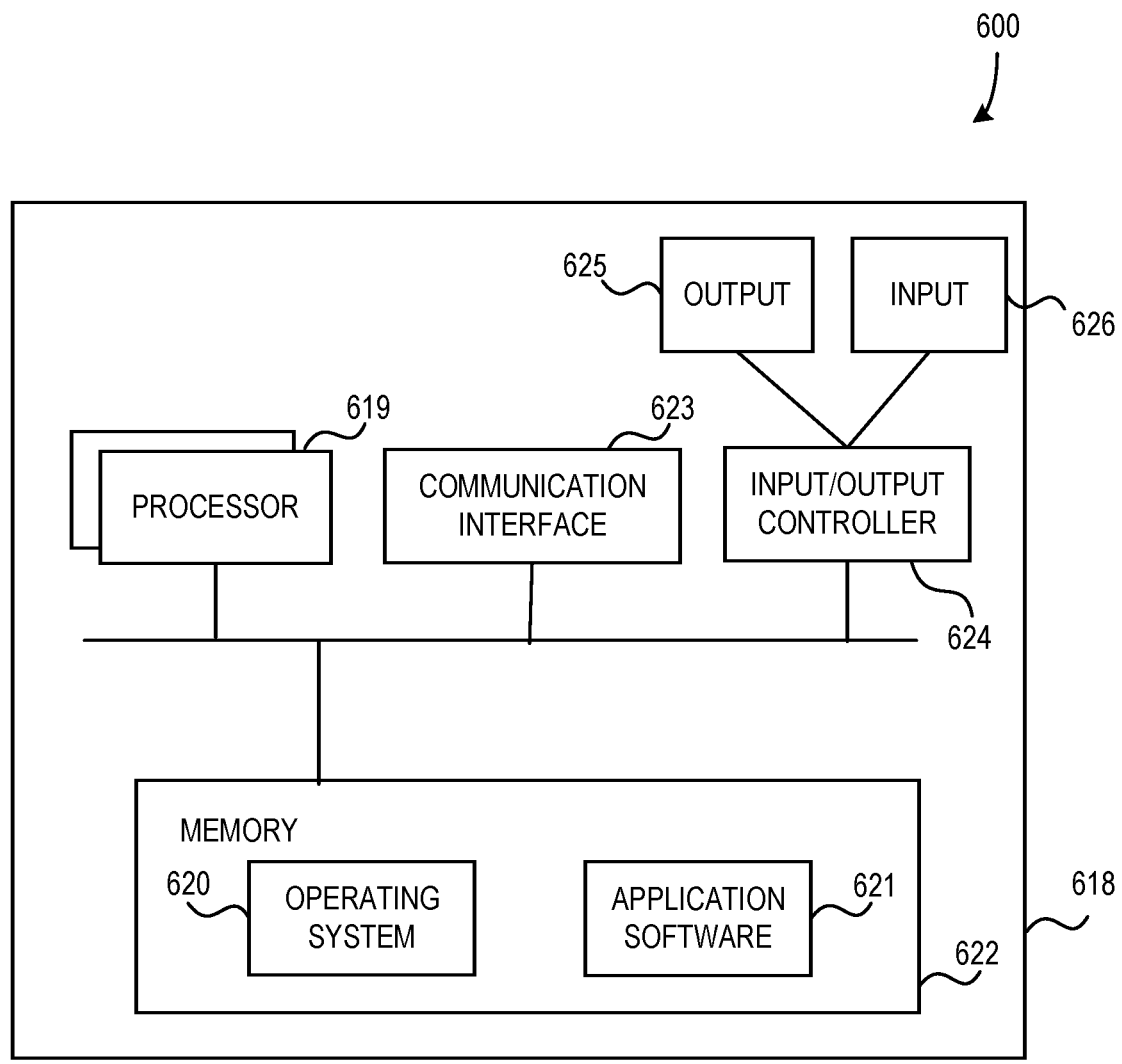
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, locklessly synchronizing the catalog files of a data caching system and an LSM tree file system as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computerized method for synchronizing a data cache with an associated log-structured merge (LSM) tree file system on an object storage platform comprises: receiving, by a processor, instructions to send a cached data set from the data cache to the LSM tree file system; generating, by the processor, an updated metadata catalog representing a data structure of the LSM tree file system that includes the cached data set, the updated metadata catalog including a parent catalog reference indicating a current metadata catalog and a last-merged catalog reference indicating a first compacted metadata catalog that matches a last-merged catalog reference of the current metadata catalog, wherein the updated metadata catalog is associated with the cached data set; based on identifying a second compacted metadata catalog generated more recently than a first compacted metadata catalog indicated by the last-merged catalog reference of the updated metadata catalog, generating, by the processor, a merged metadata catalog representing a data structure of the compacted LSM tree file system based on the second compacted metadata catalog and including the cached data set, the merged metadata catalog including a parent catalog reference indicating the updated metadata catalog and a last-merged catalog reference indicating the second compacted metadata catalog; based on the generation of the merged metadata catalog, replacing, by the processor, the association between the updated metadata catalog and the cached data set with an association between the merged metadata catalog and the cached data set; and sending, by the processor, the cached data set and the associated metadata catalog to the LSM tree file system, whereby metadata catalogs of the data cache and the LSM tree file system are synchronized to account for asynchronous compaction of the LSM tree file system.

An example computer system comprises: a processor; a non-transitory computer readable medium having stored thereon program code for synchronizing a data cache with an associated log-structured merge (LSM) tree file system on an object storage platform, the program code causing the processor to: receive instructions to send a cached data set from the data cache to the LSM tree file system; generate an updated metadata catalog representing a data structure of the LSM tree file system that includes the cached data set, the updated metadata catalog including a parent catalog reference indicating a current metadata catalog and a last-merged catalog reference indicating a first compacted metadata catalog that matches a last-merged catalog reference of the current metadata catalog, wherein the updated metadata catalog is associated with the cached data set; based on identifying a second compacted metadata catalog generated more recently than a first compacted metadata catalog indicated by the last-merged catalog reference of the updated metadata catalog, generate a merged metadata catalog representing a data structure of the compacted LSM tree file system based on the second compacted metadata catalog and including the cached data set, the merged metadata catalog including a parent catalog reference indicating the updated metadata catalog and a last-merged catalog reference indicating the second compacted metadata catalog; based on the generation of the merged metadata catalog, replace the association between the updated metadata catalog and the cached data set with an association between the merged metadata catalog and the cached data set; and send the cached data set and the associated metadata catalog to the LSM tree file system, whereby metadata catalogs of the data cache and the LSM tree file system are synchronized to account for asynchronous compaction of the LSM tree file system.

An exemplary non-transitory computer readable storage medium has stored thereon program code executable by a first computer system at a first site, the program code embodying a method comprising: receiving instructions to send a cached data set from the data cache to the LSM tree file system; generating an updated metadata catalog representing a data structure of the LSM tree file system that includes the cached data set, the updated metadata catalog including a parent catalog reference indicating a current metadata catalog and a last-merged catalog reference indicating a first compacted metadata catalog that matches a last-merged catalog reference of the current metadata catalog, wherein the updated metadata catalog is associated with the cached data set; based on identifying a second compacted metadata catalog generated more recently than a first compacted metadata catalog indicated by the last-merged catalog reference of the updated metadata catalog, generating a merged metadata catalog representing a data structure of the compacted LSM tree file system based on the second compacted metadata catalog and including the cached data set, the merged metadata catalog including a parent catalog reference indicating the updated metadata catalog and a last-merged catalog reference indicating the second compacted metadata catalog; based on the generation of the merged metadata catalog, replacing the association between the updated metadata catalog and the cached data set with an association between the merged metadata catalog and the cached data set; and sending the cached data set and the associated metadata catalog to the LSM tree file system, whereby metadata catalogs of the data cache and the LSM tree file system are synchronized to account for asynchronous compaction of the LSM tree file system.

Alternatively, or in addition to the other examples described herein, examples include any combination of the following:

wherein the current metadata catalog includes a first version value;
generating the updated metadata catalog includes assigning a second version value to the updated metadata catalog, wherein the second version value is incremented from the first version value; generating the merged metadata catalog includes assigning a third version value to the merged metadata catalog, wherein the third version value is incremented from the second version value; and wherein parent catalog references of each metadata catalog include respective version values of indicated parent metadata catalogs and last-merged catalog references of each metadata catalog include respective version values of indicated compacted metadata catalogs.

further comprising, based on identifying one or more tree levels that exceed level capacity thresholds via analysis of a tree level structure of the LSM tree file system represented in a current metadata catalog, causing, by the processor, compaction to be performed on the LSM tree file system.

wherein causing compaction to be performed on the LSM tree file system further includes: sending, by the processor, a compaction instruction to the LSM tree file system; receiving, by a second processor associated with the LSM tree file system, the compaction instruction; based on receiving the compaction instruction, identifying, by the second processor, a most recently received metadata catalog from the data cache and a most recently generated compacted metadata catalog; based on a last-merged catalog reference of the most recently received metadata catalog indicating the most recently generated compacted metadata catalog, performing, by the second processor, a compaction process on the LSM tree file system; and generating, by the second processor, a new compacted metadata catalog based on a data structure of the LSM tree file system after performance of the compaction process.

further comprising: identifying, by the processor, a most recently generated compacted metadata catalog, a most recently received metadata catalog associated with a cached data set, and an ancestor metadata catalog indicated by a parent catalog reference of the most recently generated compacted metadata catalog; comparing, by the processor, a first set of sorted data tables referenced in the received metadata catalog and a second set of sorted data tables referenced in the ancestor metadata catalog; based on identifying at least one sorted data table that is absent from the first set of sorted data tables and present in the second set of sorted data tables, performing, by the processor, a garbage collection process on the identified at least one sorted data table, whereby memory occupied by the at least one sorted data table is freed.

wherein further garbage collection processes are performed on at least one sorted data table identified based on a comparison of a plurality of ancestor metadata catalogs to the received metadata catalog, wherein the plurality of ancestor metadata catalogs are identified based on respective parent catalog references of the catalogs of the plurality of the ancestor metadata catalogs.

further comprising, based on identifying a second compacted metadata catalog generated more recently than a first compacted metadata catalog indicated by the last-merged catalog reference of the updated metadata catalog, performing, by the processor, a compaction process on at least one local index copy associated with the LSM tree file system based on the identified second compacted metadata catalog, whereby key-value tuple metadata of the at least one local index copy is updated to reflect compaction of the LSM tree file system.

wherein the data cache is installed on a client device and the LSM tree file system is installed on a server device, wherein the client device and server device are connected via a network.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving instructions to send a cached data set from the data cache to the LSM tree file system; exemplary means for generating an updated metadata catalog representing a data structure of the LSM tree file system that includes the cached data set, the updated metadata catalog including a parent catalog reference indicating a current metadata catalog and a last-merged catalog reference indicating a first compacted metadata catalog that matches a last-merged catalog reference of the current metadata catalog, wherein the updated metadata catalog is associated with the cached data set; based on identifying one or more tree levels that exceed level capacity thresholds via analysis of a tree level structure of the LSM tree file system represented in a current metadata catalog, exemplary means for causing compaction to be performed on the LSM tree file system; based on identifying a second compacted metadata catalog generated more recently than a first compacted metadata catalog indicated by the last-merged catalog reference of the updated metadata catalog, exemplary means for generating a merged metadata catalog representing a data structure of the compacted LSM tree file system based on the second compacted metadata catalog and including the cached data set, the merged metadata catalog including a parent catalog reference indicating the updated metadata catalog and a last-merged catalog reference indicating the second compacted metadata catalog; based on the generation of the merged metadata catalog, exemplary means for replacing the association between the updated metadata catalog and the cached data set with an association between the merged metadata catalog and the cached data set; and exemplary means for sending the cached data set and the associated metadata catalog to the LSM tree file system, whereby metadata catalogs of the data cache and the LSM tree file system are synchronized to account for asynchronous compaction of the LSM tree file system.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for synchronizing a data cache with an associated log-structured merge (LSM) tree file system on an object storage platform, the method comprising:
    receiving, by a processor, instructions to send a cached data set from the data cache to the LSM tree file system;
    generating, by the processor, an updated metadata catalog representing a data structure of the LSM tree file system that includes the cached data set, the updated metadata catalog including a parent catalog reference indicating a current metadata catalog and a last-merged catalog reference indicating a first compacted metadata catalog that matches a last-merged catalog reference of the current metadata catalog, wherein the updated metadata catalog is associated with the cached data set;
    based on identifying a second compacted metadata catalog generated more recently than a first compacted metadata catalog indicated by the last-merged catalog reference of the updated metadata catalog, generating, by the processor, a merged metadata catalog representing a data structure of the compacted LSM tree file system based on the second compacted metadata catalog and including the cached data set, the merged metadata catalog including a parent catalog reference indicating the updated metadata catalog and a last-merged catalog reference indicating the second compacted metadata catalog;
    based on the generation of the merged metadata catalog, replacing, by the processor, the association between the updated metadata catalog and the cached data set with an association between the merged metadata catalog and the cached data set; and
    sending, by the processor, the cached data set and the associated metadata catalog to the LSM tree file system, whereby metadata catalogs of the data cache and the LSM tree file system are synchronized to account for asynchronous compaction of the LSM tree file system.

2. The computerized method of claim 1, wherein the current metadata catalog includes a first version value;
    generating the updated metadata catalog includes assigning a second version value to the updated metadata catalog, wherein the second version value is incremented from the first version value;
    generating the merged metadata catalog includes assigning a third version value to the merged metadata catalog, wherein the third version value is incremented from the second version value; and
    wherein parent catalog references of each metadata catalog include respective version values of indicated parent metadata catalogs and last-merged catalog references of each metadata catalog include respective version values of indicated compacted metadata catalogs.

3. The computerized method of claim 1, further comprising, based on identifying one or more tree levels that exceed level capacity thresholds via analysis of a tree level structure of the LSM tree file system represented in a current metadata catalog, causing, by the processor, compaction to be performed on the LSM tree file system.

4. The computerized method of claim 3, wherein causing compaction to be performed on the LSM tree file system further includes:
    sending, by the processor, a compaction instruction to the LSM tree file system;
    receiving, by a second processor associated with the LSM tree file system, the compaction instruction;
    based on receiving the compaction instruction, identifying, by the second processor, a most recently received metadata catalog from the data cache and a most recently generated compacted metadata catalog;
    based on a last-merged catalog reference of the most recently received metadata catalog indicating the most recently generated compacted metadata catalog, performing, by the second processor, a compaction process on the LSM tree file system; and
    generating, by the second processor, a new compacted metadata catalog based on a data structure of the LSM tree file system after performance of the compaction process.

5. The computerized method of claim 1, further comprising:
    identifying, by the processor, a most recently generated compacted metadata catalog, a most recently received metadata catalog associated with a cached data set, and an ancestor metadata catalog indicated by a parent catalog reference of the most recently generated compacted metadata catalog;
    comparing, by the processor, a first set of sorted data tables referenced in the received metadata catalog and a second set of sorted data tables referenced in the ancestor metadata catalog;
    based on identifying at least one sorted data table that is absent from the first set of sorted data tables and present in the second set of sorted data tables, performing, by the processor, a garbage collection process on the identified at least one sorted data table, whereby memory occupied by the at least one sorted data table is freed.

6. The computerized method of claim 5, wherein further garbage collection processes are performed on at least one sorted data table identified based on a comparison of a plurality of ancestor metadata catalogs to the received metadata catalog, wherein the plurality of ancestor metadata catalogs are identified based on respective parent catalog references of the catalogs of the plurality of the ancestor metadata catalogs.

7. The computerized method of claim 1, wherein the data cache is installed on a client device and the LSM tree file system is installed on a server device, wherein the client device and server device are connected via a network.

8. A computer system comprising:
a processor;
a non-transitory computer readable medium having stored thereon program code for synchronizing a data cache with an associated log-structured merge (LSM) tree file system on an object storage platform, the program code causing the processor to:
receive instructions to send a cached data set from the data cache to the LSM tree file system;
generate an updated metadata catalog representing a data structure of the LSM tree file system that includes the cached data set, the updated metadata catalog including a parent catalog reference indicating a current metadata catalog and a last-merged catalog reference indicating a first compacted metadata catalog that matches a last-merged catalog reference of the current metadata catalog, wherein the updated metadata catalog is associated with the cached data set;
based on identifying a second compacted metadata catalog generated more recently than a first compacted metadata catalog indicated by the last-merged catalog reference of the updated metadata catalog, generate a merged metadata catalog representing a data structure of the compacted LSM tree file system based on the second compacted metadata catalog and including the cached data set, the merged metadata catalog including a parent catalog reference indicating the updated metadata catalog and a last-merged catalog reference indicating the second compacted metadata catalog;
based on the generation of the merged metadata catalog, replace the association between the updated metadata catalog and the cached data set with an association between the merged metadata catalog and the cached data set; and
send the cached data set and the associated metadata catalog to the LSM tree file system, whereby metadata catalogs of the data cache and the LSM tree file system are synchronized to account for asynchronous compaction of the LSM tree file system.

9. The system of claim 8, wherein the current metadata catalog includes a first version value;
generating the updated metadata catalog includes assigning a second version value to the updated metadata catalog, wherein the second version value is incremented from the first version value;
generating the merged metadata catalog includes assigning a third version value to the merged metadata catalog, wherein the third version value is incremented from the second version value; and
wherein parent catalog references of each metadata catalog include respective version values of indicated parent metadata catalogs and last-merged catalog references of each metadata catalog include respective version values of indicated compacted metadata catalogs.

10. The system of claim 8, the program code further causing the processor to:
based on identifying one or more tree levels that exceed level capacity thresholds via analysis of a tree level structure of the LSM tree file system represented in a current metadata catalog, causing compaction to be performed on the LSM tree file system.

11. The system of claim 10, wherein causing compaction to be performed on the LSM tree file system further includes:
sending a compaction instruction to the LSM tree file system;
receiving, by a second processor associated with the LSM tree file system, the compaction instruction;
based on receiving the compaction instruction, identifying, by the second processor, a most recently received metadata catalog from the data cache and a most recently generated compacted metadata catalog;
based on a last-merged catalog reference of the most recently received metadata catalog indicating the most recently generated compacted metadata catalog, performing, by the second processor, a compaction process on the LSM tree file system; and
generating, by the second processor, a new compacted metadata catalog based on a data structure of the LSM tree file system after performance of the compaction process.

12. The system of claim 8, the program code further causing the processor to:
identify a most recently generated compacted metadata catalog, a most recently received metadata catalog associated with a cached data set, and an ancestor metadata catalog indicated by a parent catalog reference of the most recently generated compacted metadata catalog;
compare a first set of sorted data tables referenced in the received metadata catalog and a second set of sorted data tables referenced in the ancestor metadata catalog;
based on identifying at least one sorted data table that is absent from the first set of sorted data tables and present in the second set of sorted data tables, perform a garbage collection process on the identified at least one sorted data table, whereby memory occupied by the at least one sorted data table is freed.

13. The system of claim 12, wherein further garbage collection processes are performed on at least one sorted data table identified based on a comparison of a plurality of ancestor metadata catalogs to the received metadata catalog, wherein the plurality of ancestor metadata catalogs are identified based on respective parent catalog references of the catalogs of the plurality of the ancestor metadata catalogs.

14. The system of claim 8, wherein the data cache is installed on a client device and the LSM tree file system is installed on a server device, wherein the client device and server device are connected via a network.

15. A non-transitory computer readable storage medium having stored thereon program code executable by a first computer system at a first site, the program code embodying a method comprising:
receiving instructions to send a cached data set from the data cache to the LSM tree file system;
generating an updated metadata catalog representing a data structure of the LSM tree file system that includes the cached data set, the updated metadata catalog including a parent catalog reference indicating a current metadata catalog and a last-merged catalog reference indicating a first compacted metadata catalog that matches a last-merged catalog reference of the current metadata catalog, wherein the updated metadata catalog is associated with the cached data set;

based on identifying a second compacted metadata catalog generated more recently than a first compacted metadata catalog indicated by the last-merged catalog reference of the updated metadata catalog, generating a merged metadata catalog representing a data structure of the compacted LSM tree file system based on the second compacted metadata catalog and including the cached data set, the merged metadata catalog including a parent catalog reference indicating the updated metadata catalog and a last-merged catalog reference indicating the second compacted metadata catalog;

based on the generation of the merged metadata catalog, replacing the association between the updated metadata catalog and the cached data set with an association between the merged metadata catalog and the cached data set; and sending the cached data set and the associated metadata catalog to the LSM tree file system, whereby metadata catalogs of the data cache and the LSM tree file system are synchronized to account for asynchronous compaction of the LSM tree file system.

16. The non-transitory computer readable storage medium of claim 15, wherein the current metadata catalog includes a first version value;

generating the updated metadata catalog includes assigning a second version value to the updated metadata catalog, wherein the second version value is incremented from the first version value;

generating the merged metadata catalog includes assigning a third version value to the merged metadata catalog, wherein the third version value is incremented from the second version value; and wherein parent catalog references of each metadata catalog include respective version values of indicated parent metadata catalogs and last-merged catalog references of each metadata catalog include respective version values of indicated compacted metadata catalogs.

17. The non-transitory computer readable storage medium of claim 15, the program code embodying a method further comprising:

based on identifying one or more tree levels that exceed level capacity thresholds via analysis of a tree level structure of the LSM tree file system represented in a current metadata catalog, causing compaction to be performed on the LSM tree file system.

18. The non-transitory computer readable storage medium of claim 17, wherein causing compaction to be performed on the LSM tree file system further includes:

sending, by the processor, a compaction instruction to the LSM tree file system;

receiving, by a second processor associated with the LSM tree file system, the compaction instruction;

based on receiving the compaction instruction, identifying, by the second processor, a most recently received metadata catalog from the data cache and a most recently generated compacted metadata catalog;

based on a last-merged catalog reference of the most recently received metadata catalog indicating the most recently generated compacted metadata catalog, performing, by the second processor, a compaction process on the LSM tree file system; and generating, by the second processor, a new compacted metadata catalog based on a data structure of the LSM tree file system after performance of the compaction process.

19. The non-transitory computer readable storage medium of claim 15, the program code embodying a method further comprising:

identifying a most recently generated compacted metadata catalog, a most recently received metadata catalog associated with a cached data set, and an ancestor metadata catalog indicated by a parent catalog reference of the most recently generated compacted metadata catalog;

comparing a first set of sorted data tables referenced in the received metadata catalog and a second set of sorted data tables referenced in the ancestor metadata catalog;

based on identifying at least one sorted data table that is absent from the first set of sorted data tables and present in the second set of sorted data tables, performing a garbage collection process on the identified at least one sorted data table, whereby memory occupied by the at least one sorted data table is freed.

20. The non-transitory computer readable storage medium of claim 19, wherein further garbage collection processes are performed on at least one sorted data table identified based on a comparison of a plurality of ancestor metadata catalogs to the received metadata catalog, wherein the plurality of ancestor metadata catalogs are identified based on respective parent catalog references of the catalogs of the plurality of the ancestor metadata catalogs.

* * * * *